(12) United States Patent
Michel (10) Patent No.: US 10,018,187 B2
(45) Date of Patent: Jul. 10, 2018

(54) TOWER SECTION PRODUCTION PROCESS

(71) Applicant: Vestas Wind Systems A/S, Aarhus N. (DK)

(72) Inventor: Bo Michel, Fanø (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/305,115

(22) PCT Filed: Apr. 23, 2015

(86) PCT No.: PCT/DK2015/050102
§ 371 (c)(1),
(2) Date: Oct. 19, 2016

(87) PCT Pub. No.: WO2015/161858
PCT Pub. Date: Oct. 29, 2015

(65) Prior Publication Data
US 2017/0122292 A1  May 4, 2017

(30) Foreign Application Priority Data
Apr. 25, 2014 (DK) .......................... PA 2014 70245

(51) Int. Cl.
*F03D 13/20* (2016.01)
*E04H 12/08* (2006.01)
(Continued)

(52) U.S. Cl.
CPC ............. *F03D 13/20* (2016.05); *B21D 47/01* (2013.01); *B23D 45/006* (2013.01); *B23K 10/00* (2013.01);
(Continued)

(58) Field of Classification Search
CPC ....... F03D 13/20; B23K 10/02; B23D 45/006; E04H 12/342; E04H 12/085;
(Continued)

(56) References Cited

U.S. PATENT DOCUMENTS

| 2009/0021019 A1* | 1/2009 | Thomsen .............. E04H 12/085 290/55 |
| 2009/0031639 A1* | 2/2009 | Cortina/Cordero ..... E04H 12/12 52/40 |

(Continued)

FOREIGN PATENT DOCUMENTS

| EP | 0796691 A1 | 9/1997 |
| EP | 1856410 A1 | 11/2007 |

(Continued)

OTHER PUBLICATIONS

European Patent Office, International Search Report and Written Opinion in PCT Application No. PCT/DK2015/050102, dated Sep. 9, 2015.

(Continued)

*Primary Examiner* — Jermie Cozart
(74) *Attorney, Agent, or Firm* — Wood Herron & Evans LLP (57) ABSTRACT

The application relates to wind turbine tower section production methods and in particular to methods of manufacturing a plurality of elongate tower segments for forming a wind turbine tower section, the tower section constructed from a plurality of elongate tower segments connected along their respective longitudinal edges. The tower section is formed from a plurality of cans connected end to end and is divided into elongate segments by cutting along two or more cut lines extending along the length of the tower. A method of providing a horizontal flange at the end of a wind turbine tower is also discussed, as is a vertical flange preassembly including a pair of vertical flanges for connecting the (Continued)

longitudinal edges of adjacent first and second tower segments.

11 Claims, 9 Drawing Sheets

(51) Int. Cl.
    *E04H 12/34*       (2006.01)
    *B23D 45/00*       (2006.01)
    *B23K 10/00*       (2006.01)
    *B21D 47/01*       (2006.01)
    *B23K 101/18*     (2006.01)

(52) U.S. Cl.
    CPC ......... *E04H 12/085* (2013.01); *E04H 12/342* (2013.01); *B23K 2201/18* (2013.01); *F05B 2220/30* (2013.01); *F05B 2230/10* (2013.01); *F05B 2230/232* (2013.01); *F05B 2230/26* (2013.01); *F05B 2230/60* (2013.01); *F05B 2240/912* (2013.01); *F05B 2280/10* (2013.01); *Y02E 10/728* (2013.01); *Y10T 29/49631* (2015.01); *Y10T 29/49968* (2015.01)

(58) Field of Classification Search
    CPC ............ F05B 2240/912; Y02E 10/728; Y10T 29/49631; Y10T 29/49968; B21D 51/16; B21D 51/02; B21D 47/00
    See application file for complete search history.

(56) References Cited

U.S. PATENT DOCUMENTS

2010/0319276 A1*  12/2010  Kryger ................. E04H 12/085
                                                           52/173.1
2011/0283652 A1   11/2011  Haridasu et al.
2013/0180199 A1    7/2013  Vadlamudi et al.

FOREIGN PATENT DOCUMENTS

| EP | 1876316 A1 | 1/2008 |
|---|---|---|
| WO | 9728920 A1 | 8/1997 |
| WO | 2004083633 A1 | 9/2004 |
| WO | 2014086170 A1 | 6/2014 |

OTHER PUBLICATIONS

Danish Patent and Trademark Office, Search Report in PA 2014 70245, dated Nov. 7, 2014.

* cited by examiner

TOWER SECTION PRODUCTION PROCESS

This invention relates to a tower section production process and in particular to methods of producing sections of wind turbine towers constructed from a plurality of elongate tower segments.

The increasing demand for wind energy may be met both by building more wind parks and by building wind parks capable of generating more energy per turbine. Generating more energy per turbine requires wind turbines with larger generators, which in turn need larger blades to capture more energy from the incident wind. Such turbines also require taller towers to support the blades, nacelle and other components. The increasing physical dimensions of modern wind turbine towers lead to difficulties in transporting the tower from the manufacturing site to the installation site where the wind turbine is to be constructed. This is particularly true if the wind turbine tower or components of the wind turbine tower are to be transported by road, for example on the trailer of a truck, since the carrying capacity of known trailers can limit the tower dimensions possible.

One way of addressing this issue is to form tower sections from smaller segments which are connected together at the site. As such it is necessary to transport segments of the tower section rather than the section as a whole. These segments are manufactured in a factory and moved to the site of wind turbine construction where the segments are assembled into a tower section and tower sections are assembled into a tower.

In one such known example, segments of a tower section are manufactured individually as separate components. However, this technique has the disadvantage that the segments may not fit together perfectly. In addition, the manufacturing process is likely to be complex, especially if the tower tapers to a lower diameter towards the top, since the segments will be mostly of different physical dimensions to one another, reducing the time and cost savings usually associated with the individual manufacture of a large number of identical parts.

In another known example, WO2004/083633 A1 provides a wind turbine tower section constructed from a plurality of elongate tower segments manufactured by first forming the tower section before cutting along longitudinal cut lines to divide the tower section into a number of elongate tower segments.

We have appreciated that it is desirable to provide an improved wind turbine tower section production method.

SUMMARY OF THE INVENTION

The invention is defined in the independent claims to which reference should now be made. Advantageous features are set out in the dependent claims.

According to a first aspect of the present invention, there is provided a method of manufacturing a plurality of elongate tower segments for forming a wind turbine tower section, the tower section constructed by connecting the plurality of tower segments along their respective longitudinal edges, the method comprising the steps of: forming each of a plurality of cans by rolling a metal sheet into a tube having a longitudinal seam formed by welding first and second opposed edges of the rolled sheet, wherein at least some of the welded seams comprise tack welds; forming the tower section by connecting the plurality of cylindrical cans end to end; and cutting along two or more cut lines extending along the length of the tower section to divide the tower section into a plurality of elongate tower segments, wherein the step of cutting along two or more cut lines comprises cutting through the tack welds.

According to a second aspect of the present invention, there is provided a wind turbine tower section comprising a plurality of cans connected end to end, wherein each of the plurality of cans comprises a tubular rolled metal sheet, wherein first and second opposed edges of the rolled sheet are welded together along a longitudinal seam, and wherein the longitudinal welded seam of at least one of the plurality of cans comprises tack welds.

According to a third aspect of the invention, there is provided a method of manufacturing a plurality of elongate tower segments for forming a wind turbine tower section, the tower section constructed by connecting the plurality of tower segments along their respective longitudinal edges, the method comprising the steps of forming a plurality of tubular cans, forming the tower section by connecting the plurality of cans end to end, supporting the tower section on a plurality of supports such that its longitudinal axis is substantially horizontal, and cutting along two or more cut lines extending along the length of the tower section to divide the tower section into a plurality of elongate tower segments, wherein at least one of the cut lines is curved with a curvature that corresponds to the deflection of the tower section as it deflects under its own weight between adjacent supports.

According to a fourth aspect of the invention, there is provided a method of providing an annular or penannular horizontal flange at the end of a wind turbine tower section, the horizontal flange being arranged to couple the tower section end to end with an adjacent wind turbine tower section, the method comprising the steps of: providing two or more planar flange segments, each having a part-annular shape, the two or more planar flange segments combining to form the horizontal flange; arranging the two or more planar flange segments to form the horizontal flange; and welding the two or more planar flange segments to an open end of the tower section.

According to a fifth aspect of the invention, there is provided a set of horizontal flange segments for forming an annular or penannular horizontal flange for the end of a wind turbine tower section, the horizontal flange being arranged to couple the tower section end to end with an adjacent wind turbine tower section, the set of horizontal flange segments comprising two or more planar flange segments, each having a part-annular shape, the two or more planar flange segments together forming the horizontal flange.

According to a sixth aspect of the invention, there is provided a method of manufacturing first and second elongate tower segments for forming a wind turbine tower section, the tower section constructed by connecting a plurality of tower segments along their respective longitudinal edges, the first tower segment having a first vertical flange and the second tower segment having a second vertical flange, the first and second vertical flanges being elongate and arranged to connect the first and second tower segments, the method comprising the steps of: connecting the first and second vertical flanges together in a coupled configuration; welding the coupled configuration of the first and second vertical flanges to a wind turbine tower section, after connecting the first and second vertical flanges together in the coupled configuration such that the vertical flanges extend longitudinally along the tower section; and dividing the tower section into first and second tower segments by cutting along two or more longitudinal cut lines, wherein one of the longitudinal cut lines is between the first and second vertical flanges, such that the first vertical flange is attached to the first tower segment and the second vertical flange is attached to the second tower segment.

According to a seventh aspect of the invention, there is provided a vertical flange preassembly comprising a pair of vertical flanges for connecting the longitudinal edges of adjacent first and second tower segments of a wind turbine tower section when the vertical flanges are attached to the first and second tower segments, the pair of vertical flanges comprising an elongate first vertical flange for attachment to the first tower segment and an elongate second vertical flange for attachment to the second tower segment, wherein the first and second vertical flanges of the vertical flange preassembly are connected together in a coupled configuration.

According to a eighth aspect of the invention, there is provided a method of manufacturing a plurality of elongate tower segments for forming a wind turbine tower section, the tower section constructed by connecting the plurality of tower segments along their respective longitudinal edges, the method comprising the steps of: providing a portable cutting unit, comprising: at least one elongate support rail; a carrier mounted on the at least one support rail such that it is moveable along the at least one support rail; a cutting head mounted on the carrier; and attachment means for removably attaching the at least one support rail to a tower section; removably attaching the portable cutting unit to the tower section with the attachment means so that the at least one support rail extends along at least part of the length of the tower section; cutting along a first longitudinal cut line by engaging the cutting head of the portable cutting unit with the tower section and moving the carrier along the at least one support rail; and dividing the tower section into a plurality of elongate tower segments by cutting along the first longitudinal cut line along the length of the tower section and along one or more additional longitudinal cut lines at different positions around the tower section circumference According to a ninth aspect of the invention, there is provided a method of manufacturing a plurality of elongate tower segments for forming a wind turbine tower section, the tower section constructed by connecting the plurality of tower segments along their respective longitudinal edges, the method comprising the steps of: providing a fixed cutting unit, comprising: at least one elongate support rail fixed directly or indirectly to a ground surface; a carrier mounted on the at least one support rail such that it is moveable along the at least one support rail; and a cutting head mounted on the carrier; rotatably supporting the tower section on a support unit along side the at least one elongate support rail such that the tower section is rotatable about its longitudinal axis and such that the longitudinal axis of the tower section is substantially parallel to the at least one elongate support rail; rotating the tower section about its longitudinal axis on the support unit to align the cutting head of the fixed cutting unit with a first desired cut position around the tower section circumference; cutting along a first longitudinal cut line extending along the length of the tower section by engaging the cutting head with the tower section in the first desired cut position and moving the carrier along the at least one support rail; rotating the tower section about its longitudinal axis on the support unit to align the cutting head of the fixed cutting unit with a second desired cut position around the tower section circumference, the second desired cut position differing from the first; cutting along a second longitudinal cut line extending along the length of the tower section by engaging the cutting head with the tower section in the second desired cut position and moving the carrier along the at least one support rail, such that the tower section is divided into tower segments along the first and second longitudinal cut lines.

BRIEF DESCRIPTION OF THE DRAWINGS

Embodiments of the invention will now be described, by way of example only, and with reference to the accompanying drawings, in which.

DETAILED DESCRIPTION

Figure 1:
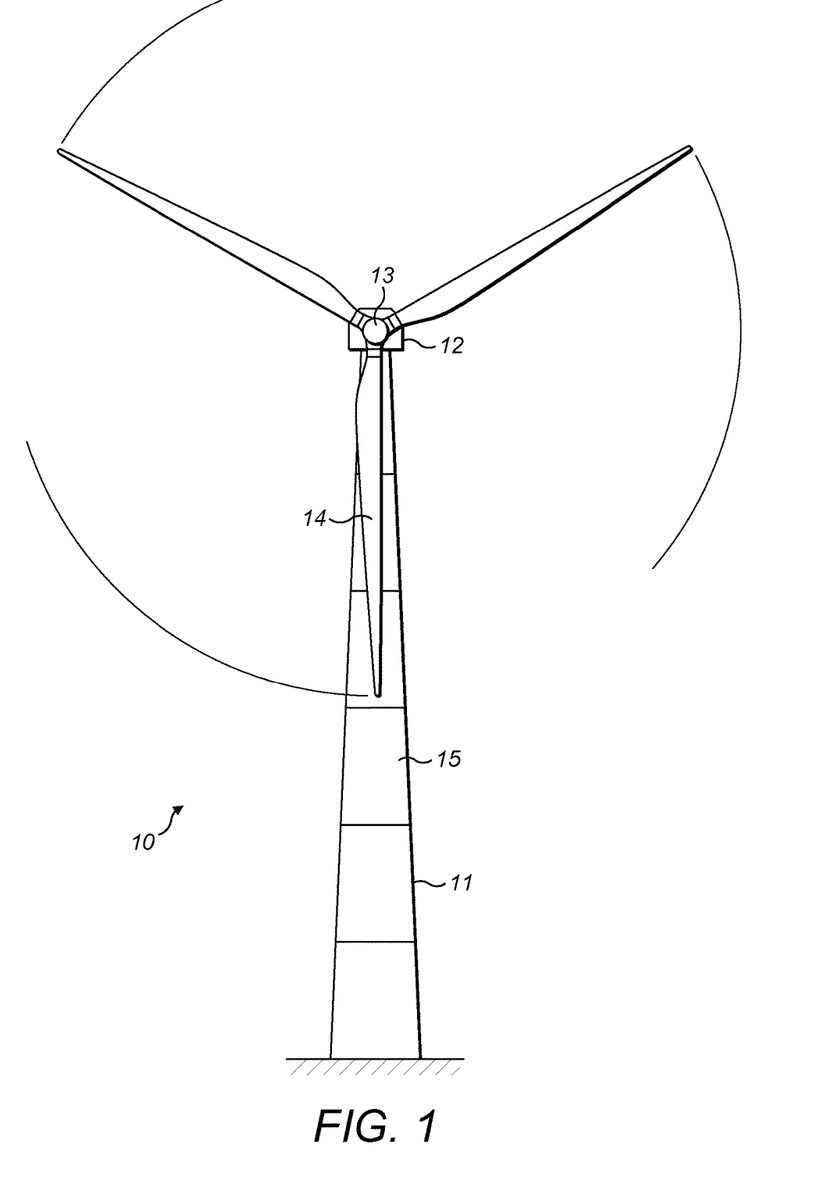
FIG. 1 is a front view of a utility-scale wind turbine.

FIG. 1 illustrates a modern utility-scale wind turbine 10 comprising a tower 11 and a wind turbine nacelle 12 positioned on top of the tower 11. The wind turbine rotor 13, comprising three wind turbine blades 14, is connected to the nacelle 12 through a low speed shaft (not shown) which extends out of the front of the nacelle 12. The different components of the wind turbine 10 are usually transported separately to the site and assembled there. To facilitate transportation, tower 11 is constructed from a number of tower sections 15 connected end-to-end, as shown. The sections 15 are provided with horizontally orientated flanges (see FIGS. 2 and 3) extending either inwardly or outwardly from the periphery of their open ends by which adjacent sections can be connected. In practice, opposing horizontal flanges of adjacent sections 15 are brought together at the site using lifting machinery, such as a tower crane, and the vertical sections 15 are then secured to one another using bolts passing through bolt holes in the horizontal flanges.

As is known from Applicant's WO2004/083633 A1, which was filed on 19 March 2003 and is herein incorporated by reference, it is known to form the tower sections 15 from a number of individual segments which are connected at the site. One or more of the sections 15 may be divided into two or more segments which combine to form the complete section 15, as discussed below with reference to FIGS. 2 and 3.

Figure 2:
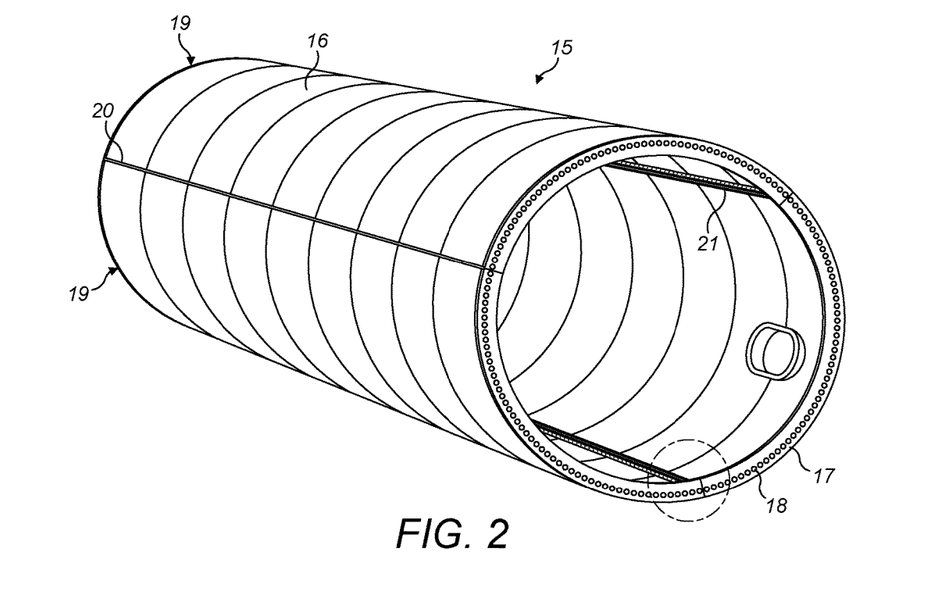
FIG. 2 is a perspective view of a tower section comprising three longitudinal segments bolted together in the lateral direction.
Figure 3:
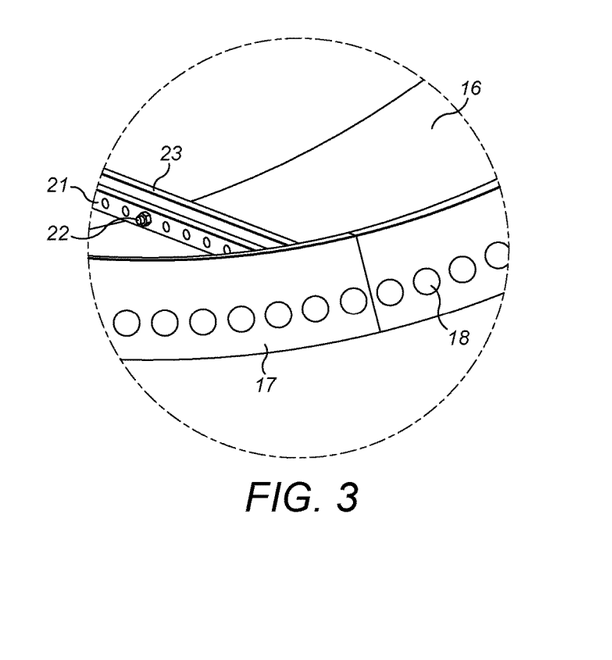
FIG. 3 is a detailed view of the encircled region shown in FIG. 2.

FIGS. 2 and 3 illustrate a section 15 of a wind turbine tower. Tower section 15 comprises a plurality of lengths of shell 16, commonly referred to as "cans", that are formed from rolled steel plate and joined together along their abutting upper and lower edges by welding. The section 15 is provided with a horizontally orientated flange 17 extending inwardly from the periphery of each of its ends. Each horizontal flange 17 includes a number of bolt holes 18 by which adjacent sections can be connected by passing bolts through adjacent bolt holes 18.

In this example, section 15 is formed from a plurality of cans 16 joined together along abutting upper and lower edges. However, in alternative examples, the tower section may be formed from a single can. The number of cans in a tower section is generally dependent on the required length of the section.

The tower section 15, and each of the cans 16 from which it is formed, is divided into three longitudinal segments 19 that combine in the assembled tower to form the complete section 15. The three segments 19 are joined together along their longitudinal edges at three longitudinal joins 20. Each segment 19 includes at opposite edges vertical flanges 21 extending inwardly from its interior surface in the region of the longitudinal joins 20. The vertical flanges 21 include a large number of bolt holes by which adjacent segments 19 are secured to one another using bolts 22 passed through the bolt holes in adjacent vertical flanges 21. The vertical flanges 21 are welded to the segments 19 at a distance from their longitudinal edges so that an elongate spacer bar or bushing can be sandwiched between the vertical flanges 21 when they are tightened together.

In this example, the segments 19 have substantially the same arc length and therefore subtend substantially the same angle with respect to the centre of the tower section 15. In alternative embodiments, it may be preferable to divide the tower section 15 into segments of unequal arc lengths.

Throughout the specification, the use of the terms 'vertical' and 'horizontal' with regard to the sections and the flanges refers to their orientation once installed in the tower, and is not therefore intended to be used in a limiting way with regard to the method of production or assembly. As will be explained below, the cutting and reassembly processes are more conveniently carried out while the tower section is laid horizontally.

In alternative examples each tower section may be formed of more or fewer than three segments. Further, the number of segments from which each section is formed may differ depending on where in the tower the section will be located. As the diameter of the tower is generally largest at the bottom, the tower sections for this part of the tower may be divided into more segments than sections from the top of the tower where the diameter is smaller.

For example, a section towards the base of the tower may comprise four segments, while the sections or sections at the top may comprise only two segments. When assembling the tower, joining the segments together into the tower sections is preferably carried out before the step of assembling the tower sections into the tower. The segments may be arranged horizontally while they are joined to one another. The longitudinal joins of adjacent segments may be aligned or offset in the circumferential direction.

Figure 7:
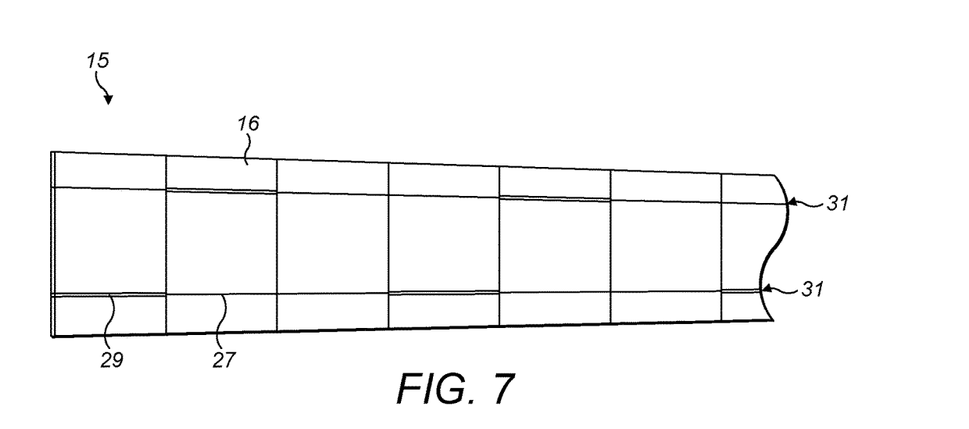
FIG. 7 is a side view of a tower section formed using a plurality of cans.
Figure 8:
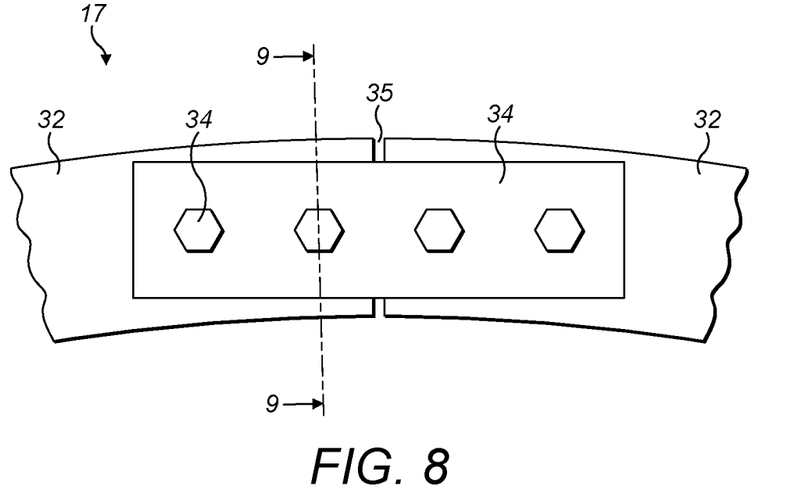
FIG. 8 is a partial end view of a tower section during manufacture.
Figure 9:
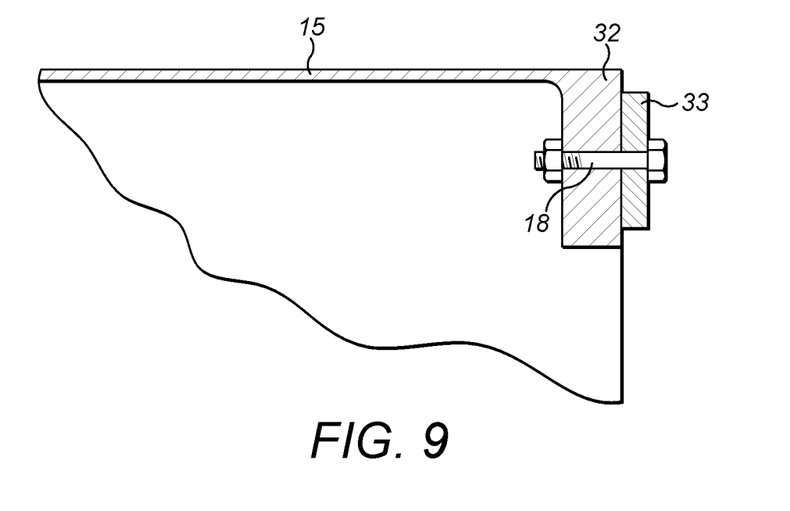
FIG. 9 is a cross sectional view taken through line 9-9 in FIG. 8.
Figure 10:
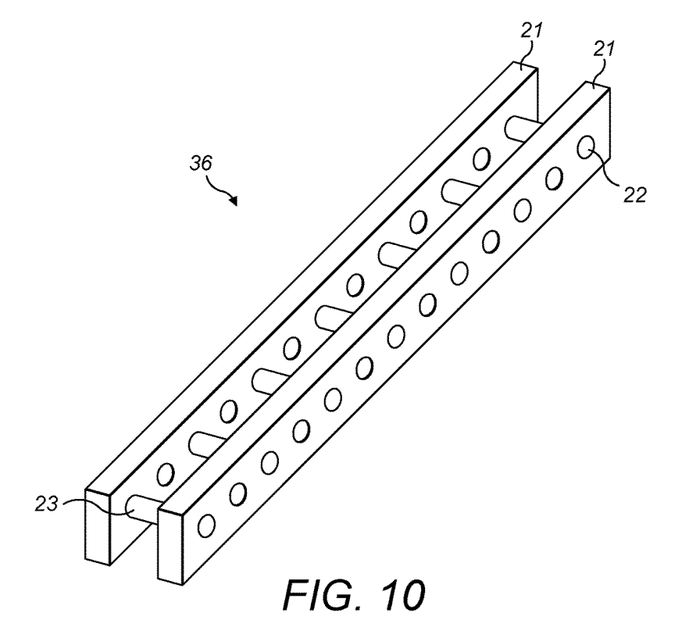
FIG. 10 is a perspective view of a set of vertical flanges for a tower section.
Figure 11:
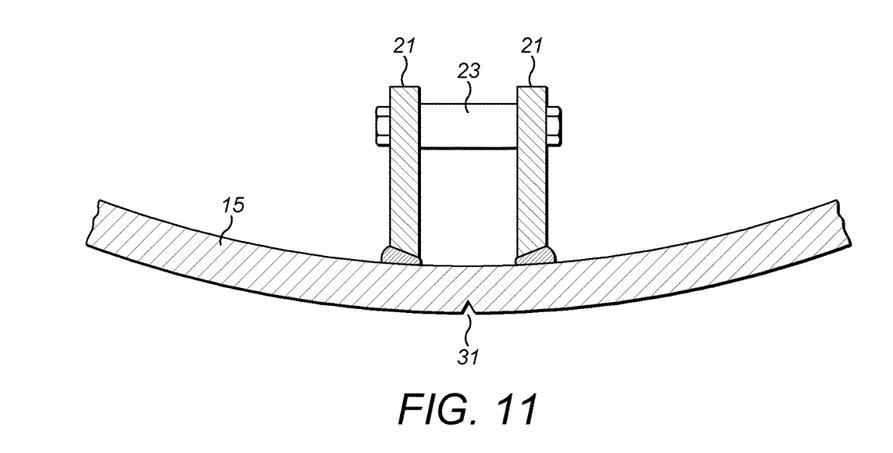
FIG. 11 is a partial cross sectional view showing the set of vertical flanges of FIG. 10 attached to a tower section.
Figure 12:
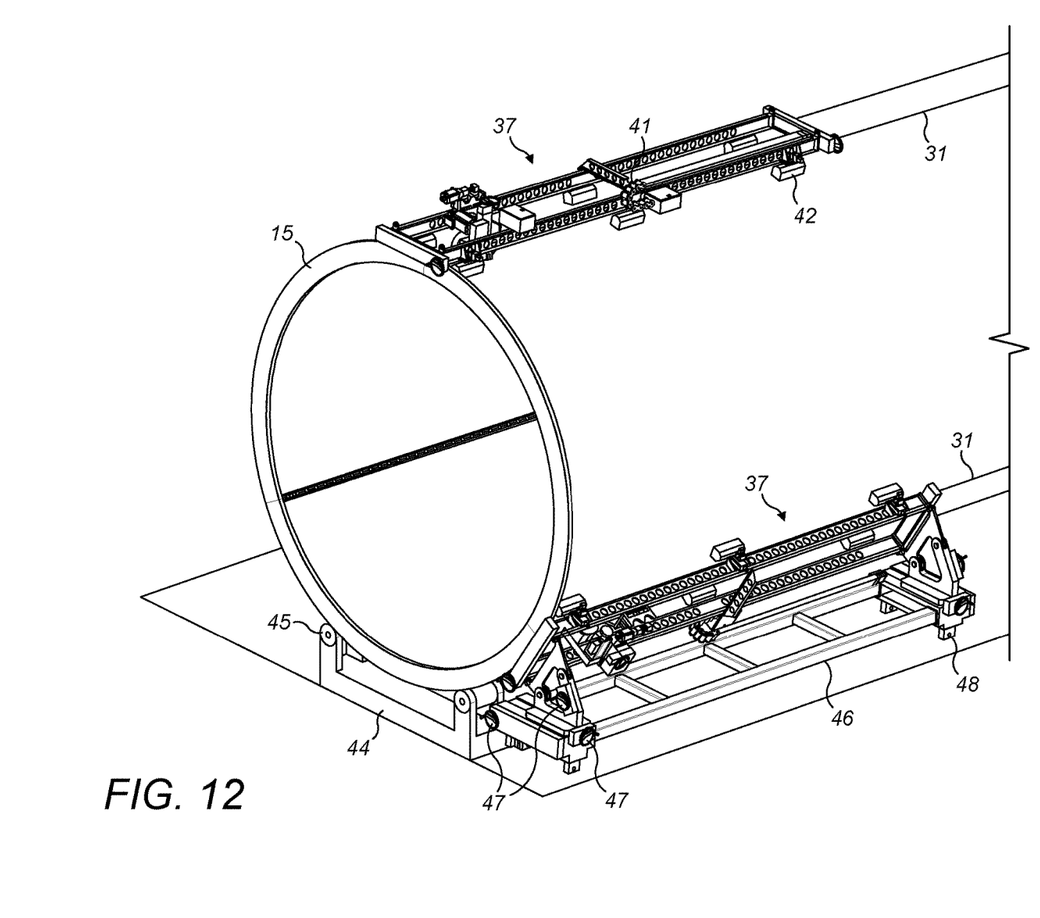
FIG. 12 is a perspective view of a first method of cutting a tower section into segments.
Figure 13:
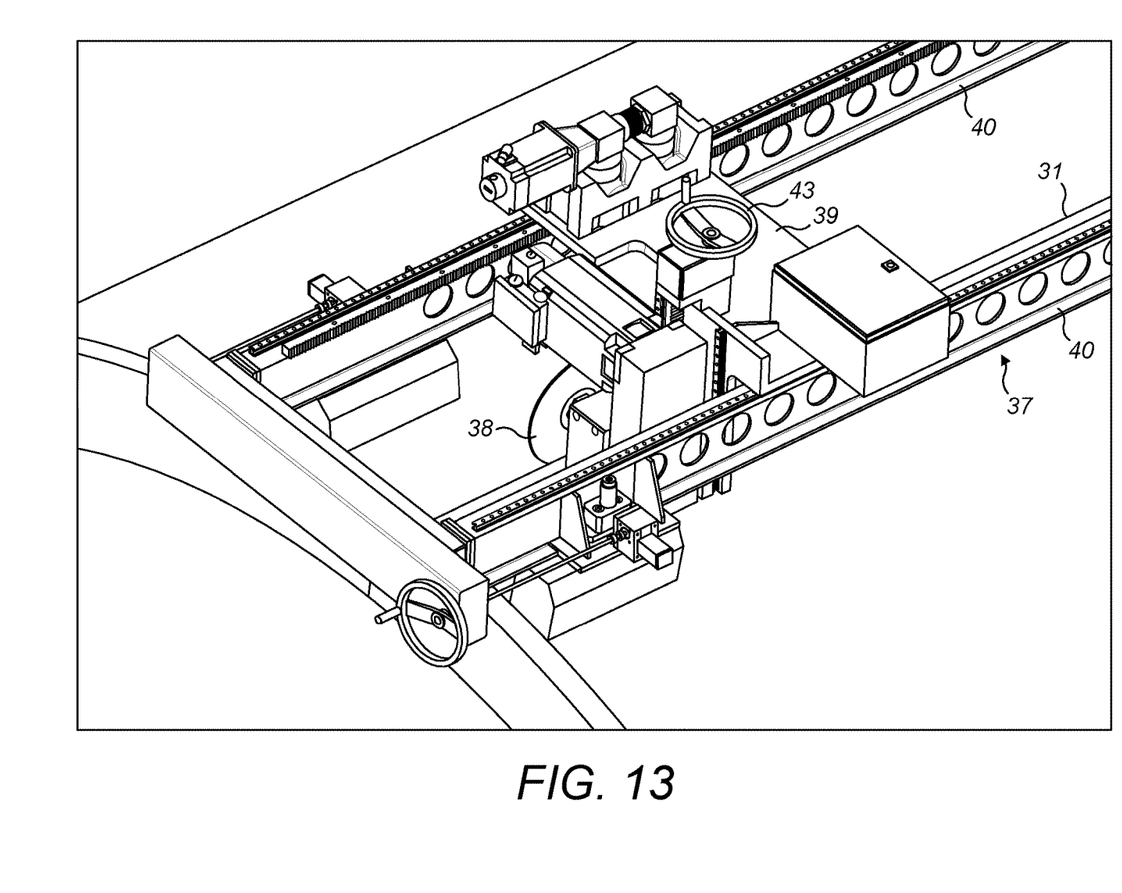
FIG. 13 is a detailed view of the cutting apparatus used in the method of FIG. 12.
Figure 14:
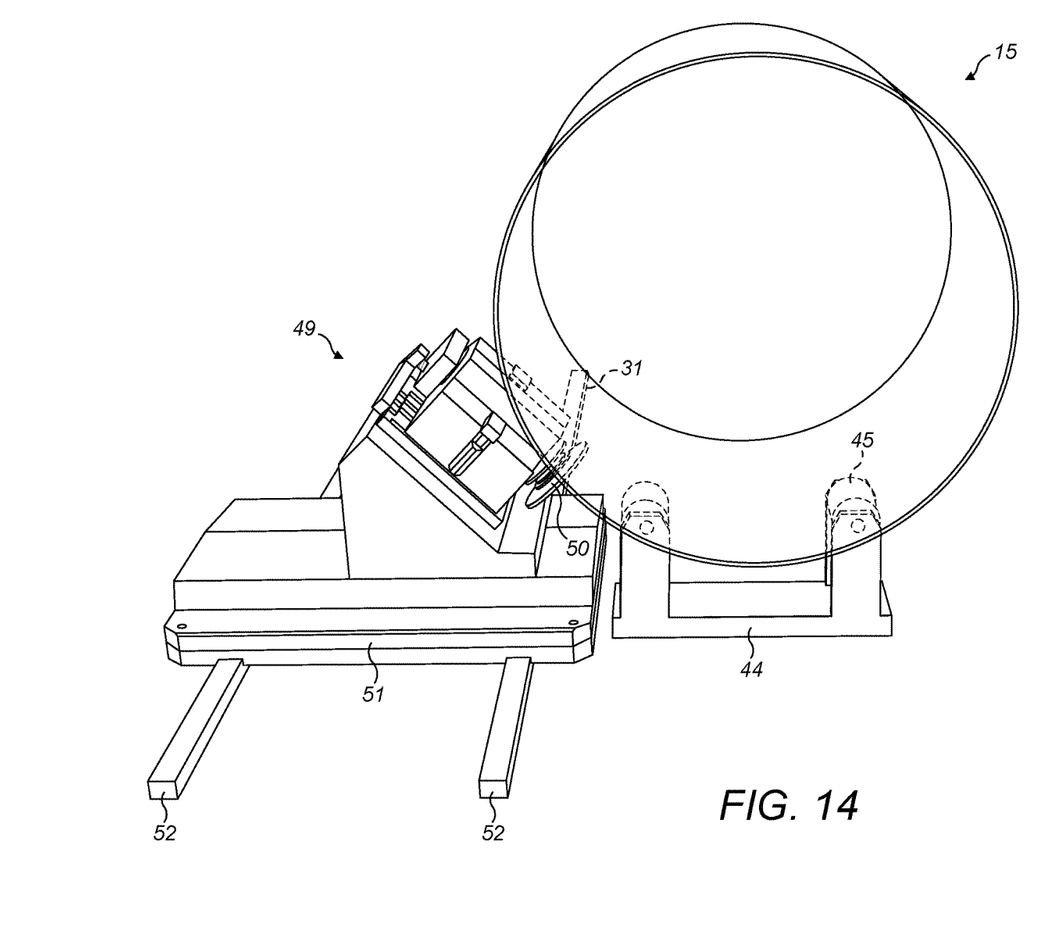
FIG. 14 is a perspective view of a second method of cutting a section into segments.

The present invention provides methods for manufacturing a segmented section of a wind turbine tower of the type illustrated in FIGS. 2 and 3 in a quicker and more accurate manner. In particular, FIGS. 4 to 6 illustrate an improved method for manufacturing a can for forming a wind turbine tower section divided into two or more segments, FIG. 7 illustrates an improved method for forming a wind turbine tower section from a plurality of cans, FIGS. 8 and 9 illustrate an improved method for providing a horizontal flange to the end of a wind turbine tower section, FIGS. 10 and 11 illustrate an improved method for providing a set of vertical flanges to a wind turbine tower section, and FIGS. 12 to 14 illustrate two improved methods for cutting a wind turbine tower section into two or more segments.

Figure 4:
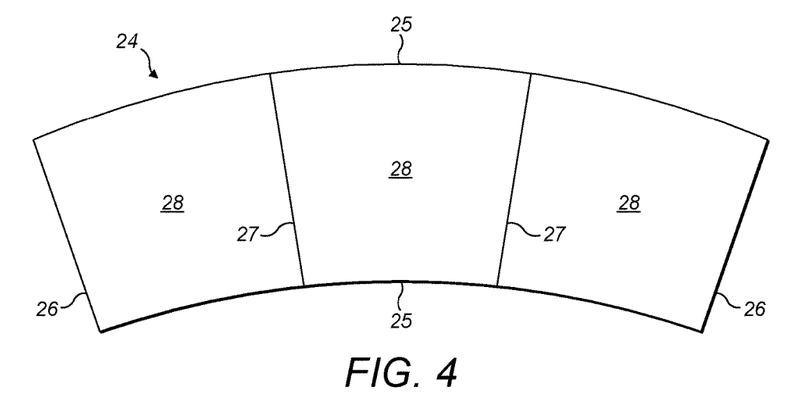
FIG. 4 is a plan view of a steel plate used in the manufacture of a tower section.
Figure 5:
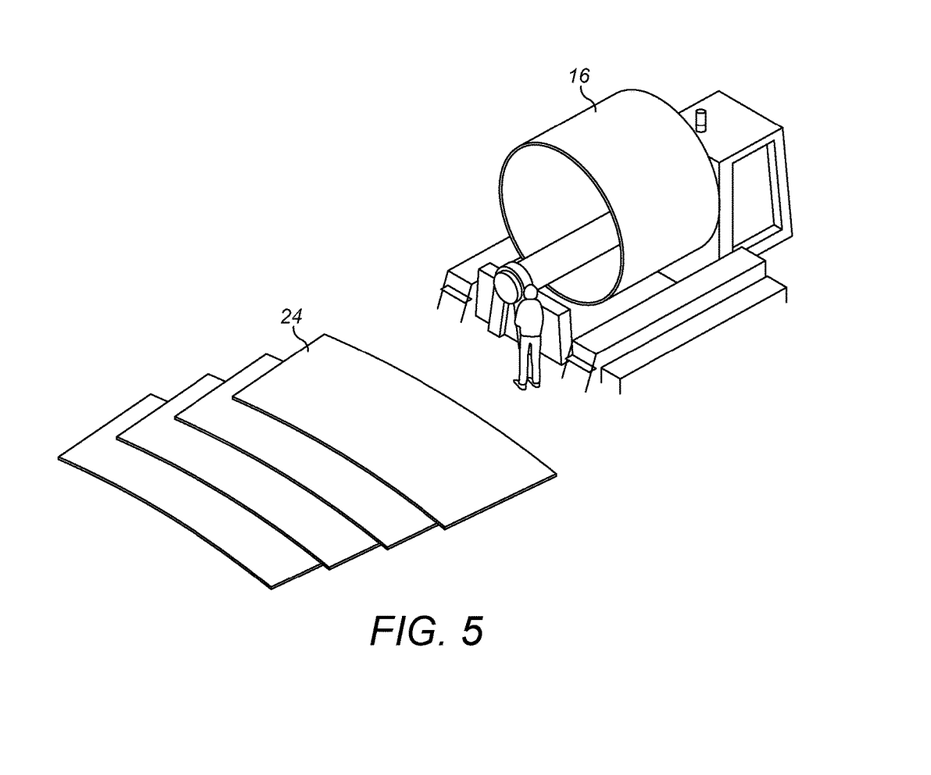
FIG. 5 is a perspective view of a manufacturing process using the steel plate of FIG. 4.
Figure 6:
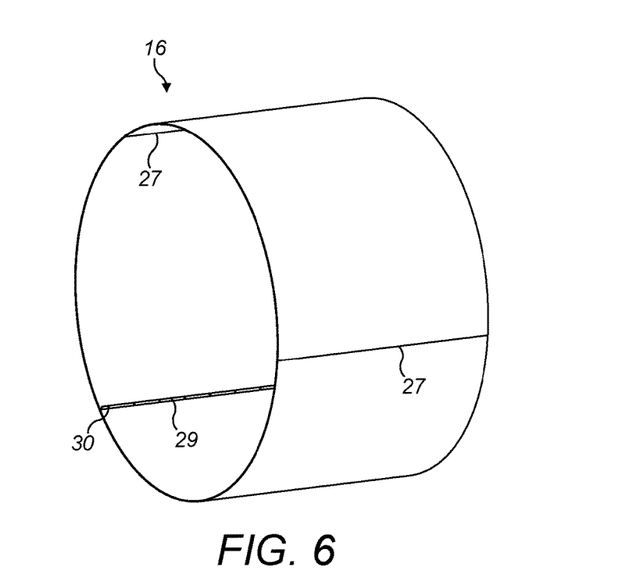
FIG. 6 is a perspective view of a can formed using the process of FIG. 5.

FIGS. 4 to 6 illustrate an improved method according an aspect of the invention for manufacturing a can for forming a wind turbine tower section divided into three segments. The can 16 is formed from a planar metal plate 24 which is cut into the desired size and shape using a conventional cutting process, for example, using a plasma cutter operated by a CNC (computer numerical control) process. Steel is by far the most commonly used material for metal towers, but other metals and alloys might be used, and the expression 'metal' used herein is intended to encompass metal and alloys thereof. The steel plate 24 may be formed from a single sheet, or from two or more separately manufactured sheets which are welded together to form the plate (for example particularly for the latest very large turbines). As shown in FIG. 4, the cut steel plate 24 has slightly arc-shaped upper and lower edges 25 and straight side edges 26, so that it will form a truncated cone when the side edges 26 are brought together. The curvature of upper and lower edges 25 is exaggerated in FIG. 4 for illustrative purposes. In alternative embodiments, the plate 24 could have an alternative shape corresponding to the shape of can required. For example, where a cylindrical can is required, the plate could be rectangular.

During the process of cutting the plate 24 into the required shape, two longitudinal cut indication lines 27 are marked onto the surface of the plate 24 by the plasma cutter as part of the CNC process to visually divide the area of the plate 24 into three equally sized shell segments 28. The cut indication lines 27 do not extend through the thickness of the plate 24 but indicate where the plate 24 should be cut in a subsequent cutting operation. The cut indication lines 27 are straight and extend between the arc-shaped upper and lower edges 25.

Once the cut indication lines 27 have been marked on the surface of the plate 22, the plate 24 is placed in a conventional rolling mill where it is rolled into a truncated cone shaped can 16, having the cut indication lines 27 on the outside, by bringing the side edges 26 together to form a longitudinal join. In accordance with an aspect of the invention the side edges 26 are then welded together to form a welded longitudinal seam 29 to keep the structure of the can 16 stable during subsequent production steps, specifically by applying tack welds 30 at intervals along the length of the seam 29. In certain embodiments, the length of each tack weld 30 is from between 10 mm to 30 mm and preferably about 20 mm. In certain embodiments, the tack welds are applied at intervals of from 100 mm to 300 mm, preferably about 200 mm. In a preferred embodiment, a tack weld of about 20 mm in length is applied at about every 200 mm along the longitudinal seam. The can 16 can then be used to form a wind turbine tower section, either on its own or in combination with further cans 16, as discussed below in relation to FIG. 7. The resulting section can be divided into three shell segments by cutting along the cut indication lines 27 and along the longitudinal seams 29 of the cans 16 from which it is formed, as discussed below in relation to FIGS. 12 to 14. By applying the cut indication lines 27 as part of the CNC process, time can be saved and the accuracy of the subsequent cut can be improved. By tack welding the longitudinal seam 29, rather than applying a continuous weld, the section can be more quickly formed as the welding time is reduced. The use of tack welds can also reduce the amount of testing subsequently required on weld integrity (typically NDT testing). Furthermore, the formed section can subsequently be cut into the segments more quickly by cutting along the tack welded longitudinal seams 29 of the cans 16, given that less material is required to be cut through.

The above process describes the use of tack welds on all longitudinal seams. However, it may be arranged that only certain longitudinal seams are tack-welded, whilst others are fully welded. Alternatively, tack welding may be used on only a proportion of any particular seam, with the remainder having a full weld.

Referring to FIG. 7, an improved method according to the invention for forming a wind turbine tower section from a plurality of cans is provided. To form the tower section 15, a number of cans 16 are positioned end-to-end and rotated to line up their respective longitudinal tack-welded seams 29 with the cut indication lines 27 of adjacent lengths of shell 16. The aligned cut indication lines 27 and longitudinal seams 29 define three continuous, longitudinal section cut indication lines 31. The section cut indication lines 31 show where the section 15 should be cut in order to divide it into separate longitudinal segments. In this embodiment, each can 16 is rotated about its longitudinal axis by 120 degrees relative to the preceding can 16. Consequently, the section cut indication lines 31 are each defined by a combination of cut indication lines 27 and longitudinal seams 29 of the cans 16. Additionally, the longitudinal seam 29 of each can 16 is offset by 120 degrees from the longitudinal seam 29 of the adjacent cans 16. Once adjacent cans 16 are positioned correctly, they are welded together along their abutting upper and lower edges. This welding of adjacent cans may be carried out as each can is brought alongside the earlier, or alternatively, some or all cans may be aligned together before welding.

By offsetting the longitudinal seam 29 of each can 16 by 120 degrees from the longitudinal seam 29 of the adjacent cans 16, the resulting structure is more stable. Horizontal and vertical flanges can then be provided to the section as discussed below in relation to FIGS. 8 to 11 and the section divided into segments by cutting along the section cut indication lines 31, as discussed below in relation to FIGS. 12 to 14.

FIGS. 8 and 9 illustrate an improved method according to the invention for providing a horizontal flange to the end of a wind turbine tower section. Rather than providing a conventional unitary flange which is welded onto the section and subsequently cut when the longitudinal cuts are made, the horizontal flange 17 according to an aspect of the present invention the flange is formed from three separate flange segments 32, each having the shape of part of an annulus, which are brought together to form the horizontal flange 17. In this embodiment, the three flange segments 32 have arc lengths which are substantially equal and which correspond to the arc lengths of the three segments into which the section 15 will be divided. Alternatively, the arc lengths of the flange segments may be smaller or larger than the arc lengths of the segments into which the section will be divided and/or may be unequal.

Prior to welding to the end of the section 15, the flange segments 32 are positioned together in the shape of the horizontal flange 17 and temporarily held together using a flange alignment plate 33 across each junction between adjacent flange segments 32. In this embodiment, the flange alignment plates 33 each include four bolt holes 34 for connecting the flange alignment plates 33 to the flange segments 32. The flange segments 32 are secured together by aligning the bolt holes 34 of the flange alignment plates 33 with the bolt holes 18 of two flange segments 32 and passing a bolt through each of the bolt holes 34 of the flange alignment plates 33 and the adjacent bolt holes 18 of the flange segments 32. When bolted together, the flange segments 32 are preferably separated by a small gap 35. The assembled horizontal flange 17 is then placed at an end of the tower section 15 so that each junction between adjacent flange segments 32 is aligned with a section cut indication line 31. The horizontal flange 17 is then welded to the end of the tower section 15, as shown in FIG. 9. The flange alignment plates 17 are then removed. The gap 35 allows that when the tower section 15 is cut longitudinally the cutting tool passes through the flange at the position of the gap thereby avoiding or reducing the amount of material to cut through.

FIGS. 10 and 11 illustrate an improved method according to the invention for providing a vertical flange set 36 to a wind turbine tower section 15. The set of vertical flanges 36 comprises two parallel, vertical flanges 21 arranged to secure adjacent segments of a tower section together along their longitudinal edges. Prior to their attachment to the vertical section 15, the vertical flanges 21 are metallized with a suitable coating, with the exception of the region in which the flanges 21 will be welded to the section 15. The vertical flanges 21 are then preassembled as a set 36 by aligning the bolt holes 22 of the two vertical flanges 21 and passing bolts through the bolt holes 22 to secure the flanges together. The preassembly of the set of vertical flanges 21 does not necessarily require the assembly of the flanges 21 at every adjacent bolt hole 22. In this embodiment, the flanges 21 are bolted together at every second bolt hole 22. In other embodiments, the flanges may be bolted together at different intervals, which may or may not be uniform along the length of the flanges. At least some of the bolts are each passed through an elongate bushing 23 which is sandwiched between the vertical flanges 21 as they are tightened together so that the vertical flanges are offset by the length of the bushing 23, as shown in FIG. 11, to correctly space the flanges 21.

The preassembled vertical flanges 21 are then placed inside the tower section 15 and aligned with an associated section cut indication line 31. When aligned, the vertical flanges 21 run parallel to the section cut indication line 31 with one of the vertical flanges 21 on either side of the section cut indication line 31. Each vertical flange 21 is then welded in position using a welding tractor (not shown), for example by welding on a single side of each vertical flange 21. The same process is repeated to provide additional sets of vertical flanges along the remaining section cut indication lines.

FIGS. 12 and 13 illustrate an improved method according to the invention for cutting a wind turbine tower section into two or more segments using portable milling units 37. Each portable milling unit 37 includes a circular milling head 38 mounted on a carrier 39 running along two parallel rails 40. The portable milling unit 37 further includes a conveyor mechanism 41 for moving the carrier 39 along the rails 40 and number of electromagnets 42 on the underside of the rails 40 for attaching the rails to the vertical section 15. The carrier 39 includes a depth adjustment mechanism 43 for varying the cutting depth of the milling head 38.

As shown in FIG. 12, tower section 15 is positioned in a support unit 44 such that its longitudinal axis is substantially horizontal. The support unit 44 has rollers 45 for rotating the section 15 about its longitudinal axis. In this embodiment, the rollers 45 are driven by a motor (not shown) operated by remote control to rotate the section 15. In alternative embodiments, the section 15 may be rotated on the rollers by other suitable means, for example manually. In this embodiment, the rolling mill used to shape the lengths of shell also functions as the support unit 44. In alternative embodiments, the support unit 44 may be a separate unit.

To attach the portable milling units 37 in place, a first portable milling unit 37 is mounted on a frame 46 to the side of the section 15 and tilted at an angle so that the underside of each of the rails 40 is in close proximity to the outside wall of the section 15. In this embodiment, the frame 46 has frame adjustment levers 47 for manually adjusting the position and tilt of a portable milling unit on the frame 46. In alternative embodiments, one or both of the position and tilt of a portable milling unit on the frame may be fixed. Alternatively, one or both of the position or tilt of a portable milling unit 37 on the frame may be adjusted by means of hydraulics, pneumatics, or one or more motors. Further, in this embodiment, the frame 46 is static and has feet 48 on which it rests. In alternative embodiments, the frame may be provided with wheels such that it is moveable, either by manual pushing or pulling, or with driving means such as a motor.

To align the first portable milling unit 37 with the section cut indication line 31, the section 15 is rotated on the rollers 45 about its longitudinal axis until the first section cut indication line 31 is aligned with the milling head 38 and the electromagnets 42 on the underside of the rails 40 are activated to clamp the first portable milling unit 37 in place against the outside wall of the vertical section 15. In this embodiment, the portable milling unit 37 is clamped to the vertical section 15 when the section cut indication line 31 is due to cut is in approximately the four o'clock position as viewed from one of the ends of the section 15 and as shown in FIG. 12. In alternative embodiments, the frame 46 may be arranged to clamp the portable milling unit 37 to the section 15 when the section cut indication line 31 is in a different position. Once the first portable milling unit 37 is clamped in place, the section 15 is rotated 120 degrees about its longitudinal axis and a second portable milling unit 37 is placed in the frame 46 so that its milling head 38 is aligned with the second section cut indication line 31. As with the first portable milling unit 37, the electromagnets 42 on the underside of the rails 40 of the second portable milling unit 37 are activated to clamp it in place against the outside wall of the vertical section 15. This process is repeated to attach a third portable milling unit 37 in line with the third section cut indication line 31.

Once in place, the milling head 38 of each portable milling unit 37 is operated to cut into the section 15 and is conveyed along the section cut indication line 31 by moving the carrier 39 along the rails 40. The speed at which the carrier 39 moves along the rails 40 can be adjusted according to the thickness of the section being cut. Where the length of the section 15 being cut is longer that the rails 40, as is the case in FIG. 12, the portable milling units 37 must repositioned after a cutting operation to continue cutting along the remaining portions of the section cut indication lines 31 in a repeat of the process outlined above.

Although the above process is described in relation to first second and third portable milling units 37 over first second and third section cut indication lines 31, fewer or more than three portable milling units 37 may be used to cut a particular section into segments. For example, a single portable milling unit may be used for all of the lines. Alternatively, to reduce the time taken to cut a particular section into segments, multiple portable milling units 37 may be used to simultaneously cut along a single section cut indication line 31.

FIG. 14 illustrates an improved method according to the invention for cutting a wind turbine tower section into two or more segments using a fixed milling unit 49. As with the method described above in relation to FIGS. 12 and 13, tower section 15 is positioned in support unit 44 such that its longitudinal axis is horizontal. The support unit 44 is the same as described above in relation to FIGS. 12 and 13. The fixed milling unit 49 includes a circular milling head 50 mounted on a carrier 51 running along two parallel rails 52 fixed to the ground adjacent to the support unit 44 and running parallel to the section 15 being cut. The milling head 50 is mounted on the carrier 51 at an angle. In this embodiment, the milling head 50 is tilted on the carrier 51 at approximately 45 degrees from vertical. In alternative embodiments, the milling head may be tilted at a different angle, depending on the position of the milling head relative to the section and the required angle of cut. The fixed milling unit 49 further includes a conveyor mechanism (not shown) for moving the carrier 51 along the rails 52. The cutting depth, position, tilt angle, or any combination thereof of the milling head 50 may be adjustable to allow the milling unit 49 to be used with vertical sections of differing geometry. For example, the milling head 50 may be adjusted using manual levers, or by means of hydraulics, pneumatics, or one or more motors.

To align the milling unit 49 with a section cut indication line 31, the section 15 is rotated on the rollers 45 about its longitudinal axis until the first section cut indication line 31 is aligned with the milling head 50, as shown in FIG. 13. The milling head 50 is then operated to cut into the section 15 and the carrier 51 is moved along the rails 52 so that the milling head 50 cuts along the length of the first section cut indication line 31. The carrier 51 is then withdrawn and returned to the start position while section 15 is rotated along its longitudinal axis to align the next section cut indication line 31 with the milling head 50. The milling head 50 is then operated to cut into the section 15 and the carrier 51 again moved along the rails 52 so that the milling head 50 cuts along the length of the section cut indication line 31. This process is repeated for the third section cut indication line 31 to divide the section 15 into three individual segments.

In this embodiment, the milling head 50 is withdrawn from the cutting position while returning to the start position. In alternative embodiments, the milling head 50 may be arranged to cut in both directions of travel to reduce processing time. In such embodiments, the section may be rotated to align the milling head 50 with the next section cut indication line 31 before the milling head 50 is returned to the start position. The milling head 50 can then be operated to cut through the next section cut indication line 31 when returning to the start position after having cut thought the first section cut indication line 31.

Alternatively, the milling head 50 may be rotated so that it can be used on two production lines, one on either side of the rails. This enables a reduction in down time as the milling unit can be used on a second side of the rails while other operations are carried out on the first side of the rails. Where the milling head is arranged to cut in both directions, this also enables the milling head 50 to alternative between tower sections on either side of the rails, for example to cut through a first tower section in one direction and to cut through a tower section on the opposite side of the rails in the opposite direction when returning to the start position.

In both methods of cutting the tower section discussed above, the section 15 remains assembled after the cutting process has been completed, due to the fact that the vertical flanges 21 between each segment are bolted together prior to cutting. This improves the ease of handling of the section during cutting. The bolting of the segments together prior to cutting also ensures that the vertical flanges 21 will align correctly when the section 15 is reassembled, for example after transportation.

Since the longitudinal seams 29 of the cans forming the section 15 are aligned with the section cut indication lines 31 and are tack welded, rather than welded fully, the section can be cut into segments more easily and quickly with less material being removed. Similarly, where separate flange segments 32 are provided to form the horizontal flange 17, the cutting process can be sped up by separating each of the flange segments 32 by a small gap 35 and aligning the gaps with the section cut indication lines 31.

Due to the significant dimension of the tower section when it is supported horizontally typically at opposite ends, for example on a roller bed, the section will deform under its own weight, bowing down between the supports; for example, a tower section of some 30 m may exhibit a maximum vertical deflection at its midpoint between supports of 120 mm. As a result of this deflection, in order to effect cuts along the section which result in straight sided segments in the un-deformed tower section for example when it is vertically orientated, cutting lines which compensate for this deflection must be followed. The section cut indication lines 31 will deform with the tower section and still indicate the cutting paths to be followed. The deflection will vary with the position of the cut. A cut made at a 6 o'clock or 12 o'clock position (assuming a radial cut) will require linear (vertical) displacement of the cutting head axis in a direction parallel to the plane of the cutting blade or perpendicular to its axis to follow the curve of the deflection. A cut made at a 3 o'clock or 9 o'clock position would need a tilting of the cutting blade axis. A cut made at an intermediate position for example 4 o'clock or 8 o'clock will require a more complex movement whereby the blade axis is both tilted and displaced to follow the curve of the cut indication line 31.

The adjustment needed to in order to effect the precise movement of the cutting head to follow the curved cut line depends on the type of cutting or milling unit, and the manner of mounting of the cutting or milling head. A fixed unit fixed relative to the ground will require the milling head to be driven along the curve to follow the curved cut line. A mobile unit directly mounted on the tower section itself may need more limited adjustment if the mounting of the milling head itself follows the deflection of the tower; for example, if a mobile unit is used secured onto the tower surface where the head is on rails which follow the tower and/or where the unit progressively moved along the length of the tower section as the cut is made this may be set to follow the curve of the cut indication line 31 with limited adjustment of depth of cut or cutting head axis.

Once the tower section has been cut into segments it can be surface treated either in an assembled or disassembled condition, depending on the capabilities of the tower production facility. In one embodiment, the section is surface treated in an assembled condition. By cutting the section using a milling head, the cut surface can be surface treated, painted, or both, without requiring additional preparation steps, such as grinding or blasting, which may be required, for example if the section were cut using a plasma torch.

Various modifications to the example embodiments described above are possible and will occur to those skilled in the art without departing from the scope of the invention which is defined by the following claims.

LIST

10. Wind turbine
11. Tower
12. Nacelle
13. Rotor
14. Blades
15. Vertical tower section
16. Can
17. Horizontal flange
18. Bolt hole in the horizontal flange
19. Longitudinal segment
20. Longitudinal join
21. Vertical flange
22. Bolt in the vertical flange
23. Bushing
24. Steel plate
25. Upper or lower edge
26. Side edge
27. Cut indication line
28. Shell segment
29. Longitudinal seam
30. Tack weld
31. Section cut indication line
32. Flange segment
33. Flange plate
34. Bolt hole in the flange plate
35. Gap
36. Vertical flange set
37. Portable milling unit
38. Milling head
39. Carrier
40. Rail
41. Conveyor mechanism
42. Electromagnet
43. Depth adjustment lever
44. Support unit
45. Roller
46. Frame
47. Frame adjustment lever
48. Feet
49. Fixed milling unit
50. Milling head
51. Carrier
52. Rail

The invention claimed is:

1. A method of manufacturing a wind turbine tower section, comprising:
   forming a plurality of elongate tower segments, the tower section being constructed by connecting the plurality of tower segments along their respective longitudinal edges, wherein the step of forming a plurality of elongate tower segments further comprises:
   forming each of a plurality of cans by rolling a metal sheet into a tube having a longitudinal seam formed by welding first and second opposed edges of the rolled sheet, wherein at least some of the welded seams comprise tack welds;
   connecting the plurality of cans end to end; and cutting along two or more cut lines extending along a length of the connected plurality of cans to divide the connected plurality of cans into the plurality of elongate tower segments, wherein the step of cutting along two or more cut lines comprises cutting along the longitudinal seams through the tack welds.

2. The method of claim 1, wherein the step of cutting along two or more cut lines comprises cutting along the longitudinal seam of each of the plurality of cans.

3. The method of claim 1, wherein the connected plurality of cans comprise two or more longitudinal section cut indication lines indicating where the two or more cut lines are to be made during the step of cutting.

4. The method of claim 3, wherein the section cut indication lines are at least partially defined by one or more cut indication marks arranged on the outer surface of one or more of the plurality of cans.

5. The method of claim 4, wherein the step of connecting the plurality of cans further comprises aligning the longitudinal seam of at least one can having tack welds with a cut indication mark on the outer surface of an adjacent can such that at least one of the section cut indication lines is at least partially defined by the longitudinal seam.

6. The method of claim 4, wherein prior to forming the cans each unrolled sheet is cut to an appropriate size and shape using a cutting device, and wherein the step of applying one or more cut indication marks comprises cutting one or more cut indication marks into the surface of the unrolled sheet.

7. The method of claim 6, wherein the cutting device comprises a CNC-operated plasma cutter.

8. The method of claim 1, further comprising the step of circumferentially offsetting the longitudinal seams of adjacent cans before connecting the plurality of cans.

9. The method of claim 1, wherein the length of each of the tack welds is from about 10 mm to about 30 mm.

10. The method of claim 1, wherein the tack welds are applied at intervals of from about 100 mm to about 300 mm.

11. The method of claim 1, wherein the plurality of cans are connected end to end by welding.

* * * * *